(12) United States Patent
Kroeger et al.

(10) Patent No.: US 11,428,269 B2
(45) Date of Patent: Aug. 30, 2022

(54) ROLLING-ELEMENT BEARING ASSEMBLY

(71) Applicant: AKTIEBOLAGET SKF, Gothenburg (SE)

(72) Inventors: Jan Kroeger, Elmshorn (DE); Peter Lemper, Hitzacker (DE); Hans-Juergen Liesegang, Schortens (DE); Klaus-Dieter Schulz, Jameln (DE)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 17/088,719

(22) Filed: Nov. 4, 2020

(65) Prior Publication Data

US 2021/0140485 A1    May 13, 2021

(30) Foreign Application Priority Data

Nov. 11, 2019   (DE) .......................... 102019217379.9

(51) Int. Cl.
*F16C 33/78* (2006.01)

(52) U.S. Cl.
CPC ...... *F16C 33/7886* (2013.01); *F16C 33/7813* (2013.01); *F16C 33/7823* (2013.01); *F16C 2300/14* (2013.01)

(58) Field of Classification Search
CPC ............. F16C 33/7813; F16C 33/7816; F16C 33/782; F16C 33/7823; F16C 33/783; F16C 33/7853; F16C 33/7886; F16C 33/805
See application file for complete search history.

(56) References Cited

U.S. PATENT DOCUMENTS

| | | | |
|---|---|---|---|
| 3,396,975 A | 8/1968 | Lee | |
| 6,082,721 A | 7/2000 | Kingsley | |
| 8,535,009 B2 | 9/2013 | Hofmann | |
| 9,347,495 B2* | 5/2016 | Ito | F16C 33/586 |
| 2020/0025252 A1 | 1/2020 | Rettinger et al. | |

(Continued)

FOREIGN PATENT DOCUMENTS

| DE | 20203372 U1 | 6/2002 |
|---|---|---|
| DE | 102009014923 A1 | 9/2010 |

(Continued)

OTHER PUBLICATIONS

European Search Report from the European Patent Office dated Mar. 22, 2021 in related application No. EP 20 20 6374, including European Search Opinion, and translation thereof.

(Continued)

*Primary Examiner* — James Pilkington
(74) *Attorney, Agent, or Firm* — J-Tek Law PLLC; Scott T. Wakeman; Mark A. Ussai (57) ABSTRACT

A rolling-element bearing assembly includes first and second bearing rings that form a bearing interior between them and a plurality of rolling elements disposed in the bearing interior and a seal assembly for sealing the bearing interior. The seal assembly includes a seal carrier and a seal element having at least one primary seal lip for sealing the bearing interior and a secondary seal lip for sealing against external contamination. The seal element is connected to the seal carrier such that the primary seal lip and the secondary seal lip abut axially against an axial end surface of the second bearing ring.

20 Claims, 4 Drawing Sheets

(56) References Cited

U.S. PATENT DOCUMENTS

2020/0063799 A1    2/2020  Pilk et al.
2021/0140483 A1*   5/2021  Kroeger .............. F16C 33/7886

FOREIGN PATENT DOCUMENTS

| DE | 202011109164 U1 | 1/2012 |
| --- | --- | --- |
| DE | 102010044173 A1 | 5/2012 |
| DE | 102010053203 A1 | 6/2012 |
| DE | 102011121281 A1 | 6/2013 |
| DE | 102013200356 A1 | 8/2013 |
| DE | 102012213508 | 4/2014 |
| DE | 102017107005 | 9/2018 |
| EP | 1873428 A1 | 1/2008 |
| EP | 2527694 A1 | 11/2012 |
| EP | 2620643 A1 | 7/2013 |
| EP | 2863083 A1 | 4/2015 |
| EP | 2940329 A1 | 11/2015 |
| JP | 2009264404 * | 11/2009 |
| JP | 2011089619 A | 5/2011 |
| JP | 2014088891 * | 5/2014 |
| WO | WO2015169650 * | 11/2015 |
| WO | 2018185288 A1 | 10/2018 |

OTHER PUBLICATIONS

European Search Report from the European Patent Office dated Mar. 23, 2021 in related application No. EP 20 20 6376, including European Search Opinion, and translation thereof.

Office Action from the United States Patent Office dated Oct. 13, 2021 in related U.S. Appl. No. 17/088,728.

* cited by examiner

ROLLING-ELEMENT BEARING ASSEMBLY

CROSS-REFERENCE

This application claims priority to German patent application no. 10 2019 217 379.9 filed on Nov. 11, 2019, the contents of which are fully incorporated herein by reference.

TECHNOLOGICAL FIELD

The present disclosure is directed to a rolling-element bearing assembly, in particular a double row tapered roller bearing, the rolling-element bearing assembly has in particular a diameter of more than one meter.

BACKGROUND

In the following, bearings that include an outer ring having a diameter of more than one meter are referred to as "large rolling-element bearings." Other criteria, and in particular other diameter values, can also be used for the definition of large rolling-element bearings. In any case, such bearings are significantly larger than those that are usually used in everyday applications, such as, for example, in automobiles, and that have an outer diameter of a small number of centimeters.

Large rolling-element bearings are usually used in heavy industry, such as, for example, wind turbines, tunnel boring machines, roll bearing assemblies, etc., and often must work in particularly difficult environments.

In the construction of large rolling-element bearings a pure upscaling of the bearing geometry starting from a known small bearing is therefore generally not possible, since in addition to the extreme environmental conditions, large rolling-element bearings also have other requirements for weight, installation, and repair.

A further problem with such large rolling-element bearings is the sealing of the bearing interior. Due to the large dimensions, even with very slight imbalances of the components rotating with respect to one another, large oscillations occur that can lead to a loss of contact of seals against the respective other component, and thus a sufficient sealing is not always guaranteed. In the prior art radially acting seals are therefore used that are also known as radial shaft seals, wherein an additional spring presses the radially abutting seal lip against the slip surface. Here the spring element ensures that even with imbalances or manufacturing inaccuracies of the components the seal lip reliably slips against the corresponding slip surface, and the interior of the bearing is securely sealed in all operating states.

However, it is disadvantageous with such radial shaft seal rings that they only ensure the contact, but cannot compensate for an excessive contact pressure, with the result that such radial shaft seal rings often wear out and must be replaced.

In order to keep the wear of the radial shaft seal rings as low as possible, it is furthermore known from the prior art to provide a slip ring against which the radial shaft seal rings can slip. This is designed to compensate for imbalances, but must be additionally manufactured, which makes the production and manufacturing of the bearing rings significantly more time and cost intensive. Furthermore, with such additional sleeves it must be ensured that they have an additionally produced slip surface, which also drives the production costs higher.

SUMMARY

An aspect of the present invention is therefore to provide a rolling-element bearing assembly, in particular for a wind turbine, that makes possible a sealing of the bearing interior, wherein the seal can be used over the entire service life of the bearing, or wear of the seal lips can be reduced and the costs are simultaneously reduced.

In the following a rolling-element bearing assembly is presented including a first bearing ring and a second bearing ring that form a bearing interior between them in which rolling elements are disposed in order to allow relative rotation of first and second bearing rings. Such a rolling-element bearing assembly can in particular be a double row tapered roller bearing. Furthermore, such a rolling-element bearing assembly is usable in particular for heavy industry, wherein the first and/or the second bearing ring have a diameter of more than one meter. For sealing the bearing interior the rolling-element bearing further includes a seal assembly, wherein the seal assembly includes a seal carrier that is connected to the first bearing ring such that they rotate together, a clamping ring and a seal element that is connected to the seal carrier such that they rotate together. The seal assembly includes a radially outer portion in contact with the first bearing ring and a radially inner portion defining a radially inner opening. Such seal carriers are usually used when the outer ring is configured relatively narrow in comparison to the inner ring in order to save weight. However, for this purpose it is necessary to redesign the sealing situation of the bearing rings or of the bearing interior, wherein the seal assembly must nevertheless have a sufficient distance to the rolling elements contained in the bearing interior and the cage holding the rolling elements.

In order to provide a reliable, cost-effective and low-wear sealing for the rolling-element bearing, the seal element further includes at least one primary seal lip for sealing the interior and a secondary seal lip for sealing against external contaminants, wherein the seal element is connected to the seal carrier such that they rotate together. Furthermore, the primary and the secondary seal lip abut against the end surface of the second bearing ring in an axially sealing manner, so that on the one hand a reliable sealing is ensured, on the other hand the seal lip does not wear excessively even with axial and radial imbalances.

It has surprisingly been shown that an axial sealing is possible with such (large) rolling-element bearings, since on the one hand the distance between the seal carrier and the end side of the inner ring can be highly precisely set, and thus the contact force of the seal ring or of the seal lip against the axial end surface of the bearing ring can be precisely defined, and on the other hand additional elements, such as, for example, spring elements, can be omitted. On the one hand this facilitates the manufacturing of the seals, and on the other hand an additional contact force that acts on the seal lips and causes them to wear can be omitted.

The axial sealing is in contrast to the conventional teaching of the persons skilled in the art who assume that an axially slipping seal lip cannot seal sufficiently. The reason for this is that especially in large rolling-element bearings, imbalances or manufacturing inaccuracies that always occur (it is simply not possible to manufacture a ring that is circular in the mathematical sense) lead to large oscillations in the distance between the components rotating with respect to one another. The spring element of the radial shaft seal has therefore been considered to be indispensable, since otherwise it cannot be ensured that a sealing will occur in all operating states, that is, an abutting of the seal lip against the bearing ring or the sleeve.

However, it has been found that even axially slipping seal lips seal the bearing interior sufficiently for all operating states, in particular when their contact force is precisely determined over the service life of the rolling-element bearing assembly, and the seal lips are correspondingly designed. According to one preferred exemplary embodiment, the primary seal lip therefore abuts against the end surface of the second bearing ring with a predetermined contact force.

Here it is preferred in particular that the contact force of the primary seal lip is determined by a length of the seal lip, an angle of the seal lip with respect to the end surface, a material of the seal lip, a geometric design of the seal lip, and/or a defined distance of the seal carrier to the end surface of the second bearing ring. Alone or in combination, the above-mentioned factors play an important role for the contact force of the seal on the end surface of the bearing ring and can be determined more precisely with the aid of simulations.

According to a further advantageous exemplary embodiment, not only the above-mentioned factors are crucial for the determination of the contact force, but also a lip-spread angle between the primary seal lip and the secondary seal lip, wherein the primary seal lip is directed toward the interior, while the secondary seal lip is oriented in the opposite direction. The lip-spread angle, which preferably falls in the range from 100° to 140°, preferably at approximately 120°, ensures that the seal lips mutually align, so that the seal lips are in principle in abutment against the end surface of the bearing ring.

According to a further advantageous exemplary embodiment, the seal element is manufactured from nitrile butadiene rubber or hydrogenated acrylonitrile butadiene rubber. On the one hand, these materials are highly elastic, and on the other hand sufficiently stiff to form optimized contact-force-determining properties for the seal lips. Furthermore, they show a high resistance to ozone and can also be used at low temperatures.

According to a further advantageous exemplary embodiment, the seal element is furthermore a seal body that carries the primary seal lip and the secondary seal lip, wherein the seal body, the primary seal lip and the secondary seal lip form a one-piece element. Due to this one-piece nature the interaction between the seal-lip body, the seal carrier, and the end-side slip surface on the bearing inner ring can ensure a constant contact of the seal lips.

According to a further advantageous exemplary embodiment, the seal carrier is manufactured from a fiber-reinforced plastic material, in particular a FRP material. The weight can thereby be further reduced, so that the total weight of the bearing is reduced overall. In addition, such seal carriers are very dimensionally stable and easy to manufacture, and can be easily attached to the bearing ring. Of course, however, it is also possible that the seal carrier is manufactured from a metal-plate material as usual.

In order to achieve the necessary stability and dimensional stability even with large rolling-element bearings, however, the seal carrier is preferably not manufactured from layers as usual, but rather is compression-molded from a fiber matrix composite plate (SMC method). A post-processing of the seal carrier is then not necessary. On the one hand the manufacturing process can thereby be accelerated, and on the other hand errors that can arise due to faulty laminating of the fiber-reinforced plastic can thereby be avoided. In addition, using the compression-molded fiber matrix composite plates a high dimensional accuracy can be achieved, so that the purely axial sealing instead of the use of a radial shaft seal ring is possible without problems even in large rolling-element bearings.

In order to attach the seal carrier and the seal element to the seal body, the seal body is usually disposed on a radial surface of the seal carrier and attached to the seal carrier by a clamping ring that extends circumferentially. This circumferentially extending clamping ring ensures that the seal element is held radially and axially in a predetermined position, so that the seal lips slip against the end side of the bearing ring with a defined contact force.

Here the clamping ring can be attached to the seal carrier by screws.

Furthermore, it is possible to clamp the seal element between the seal carrier and the clamping ring. Alternatively or additionally, the seal element can be attached to the clamping ring by friction-fit, in particular using an attachment element. In addition, alternatively or additionally the seal element and the seal carrier/clamping ring can also include structures interacting with one another in an interference-fit manner, which structures also allow for the possibility of a radial and axial attachment of the seal element with the clamping ring and/or the seal carrier. Of course, it is also possible to additionally or alternatively only attach the seal element to the clamping ring or the seal carrier in a materially-bonded manner, wherein in particular an adhesive can be used.

In order to furthermore produce a rotation lock of the seal carrier and seal element or to carry out a radial, axial, and circumferential position-securing, the seal element and/or the seal carrier can include structures for attaching the seal element to the seal carrier such that they rotate together. Here it is preferred in particular when the seal carrier includes an undercut, and the seal element engages into the undercut by a flange formed on the seal body, whereby the seal element is fixable to the seal carrier.

A further aspect of the present disclosure relates to a wind turbine including a rotor-shaft main bearing assembly, which includes a roller assembly as described above.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
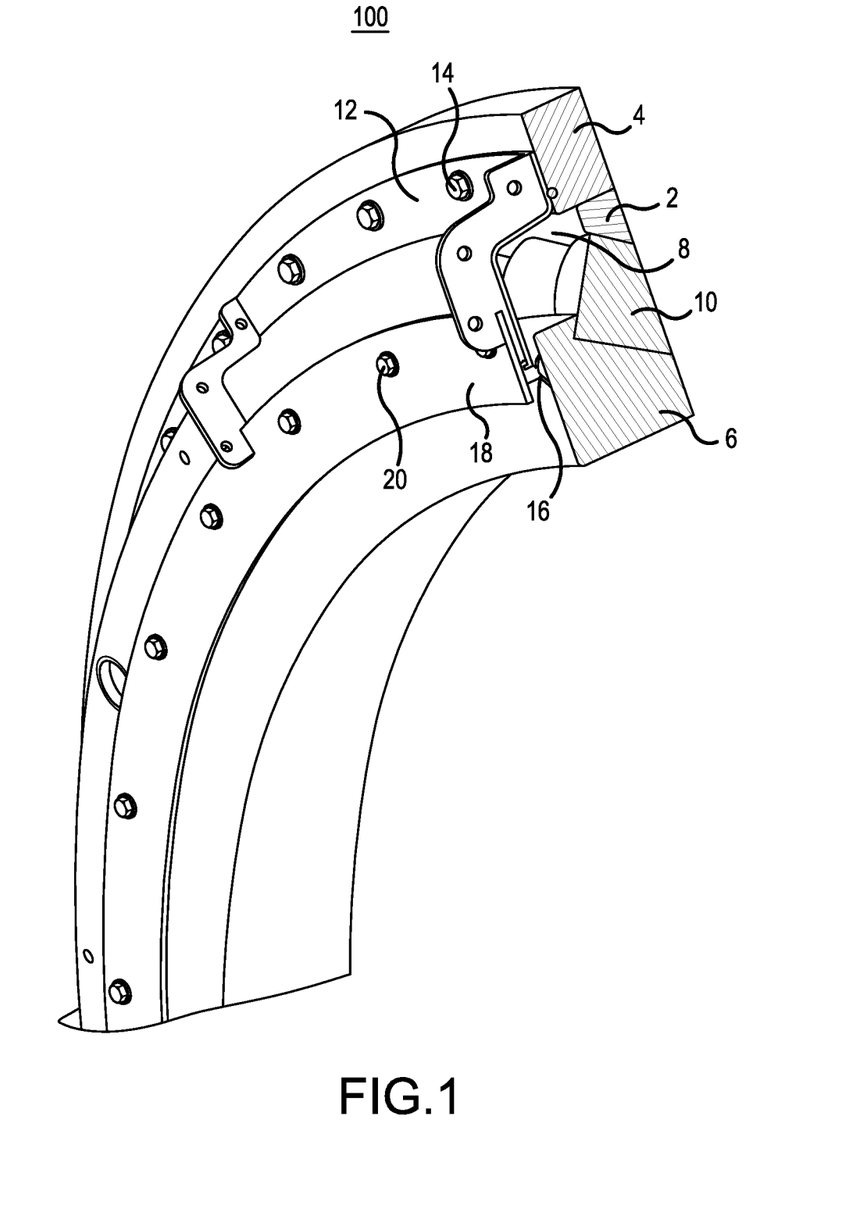
FIG. 1 is a schematic perspective partial view of a rolling-element bearing assembly according to a first exemplary embodiment.

FIG. 1 schematically shows a perspective partial view of a rolling-element bearing assembly 100 including an outer ring 2, which is connected to a shaft 4 such that they rotate together, and an inner ring 6, wherein outer ring 2 and inner ring 6 form a bearing interior 8 between them in which rolling elements 10 are disposed.

Figure 2:
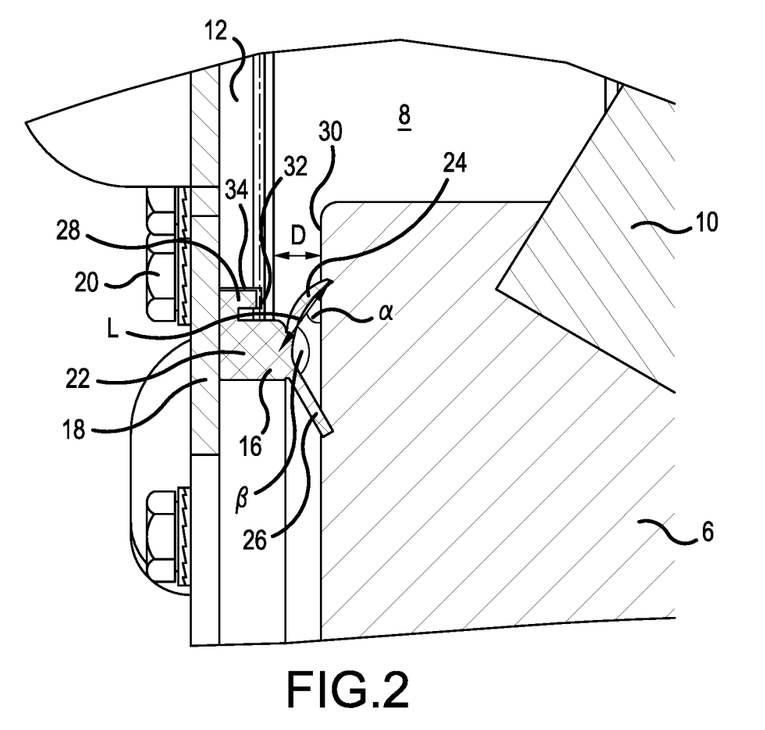
FIG. 2 is a schematic sectional view of the rolling-element bearing assembly of FIG. 1.

In order to protect the bearing interior 8 from contamination by dirt, water, or particles generally, and in order to retain a lubricant that may be located in the bearing interior 8, the bearing interior 8 must be sealed outwardly. For this purpose a seal carrier 12 is usually attached to the outer ring 2 or the shaft 4, which seal carrier 12 is attached in the exemplary embodiment shown in FIG. 1 by screws 14 and at least partially covers the bearing interior 8. Here the seal carrier 12 extends from the bearing outer ring 2 or shaft 4 to the bearing inner ring 6 and carries a seal element 16. This design is also depicted enlarged in the sectional view of FIG. 2, wherein, however, FIG. 2 shows only the bearing inner ring 6, the rolling element 10, but not the outer ring 2. Furthermore the seal carrier 12 is depicted in FIG. 2, which seal carrier 12 carries a seal element 16.

In the exemplary embodiments depicted in the figures the seal element 16 is configured as an axial seal element. However, it is also possible to form the seal element as a radial shaft seal ring.

In order to attach the seal element 16 to the seal carrier 12 such that they rotate together, a clamping ring 18 is furthermore provided that is in turn attached circumferentially to the seal carrier 12 by screws 20 such that the seal element 16 is clamped between seal carrier 12 and clamping ring 18. The seal element itself is also attached by the screws 20 to the clamping ring 18 in the circumferential direction such that the seal element and the clamping ring 18 rotate together and the seal element is attached at an axially defined distance to the bearing inner ring 6. The various attachment possibilities are discussed in more detail below.

Figure 3:
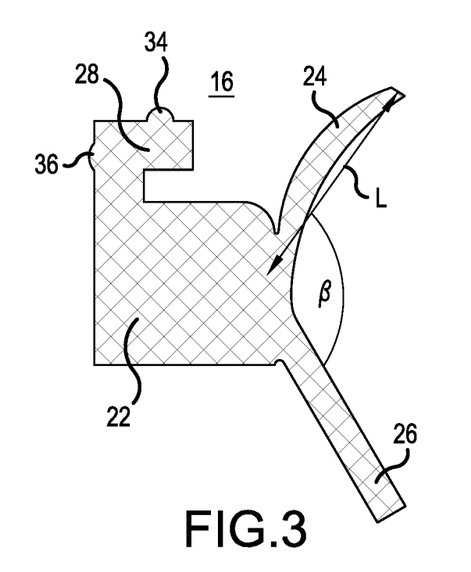
FIG. 3 is a schematic perspective detail view of the seal element used in FIG. 1 and FIG. 2.

As can be seen from FIG. 2 and FIG. 3, the seal element 16 includes a seal body 22 that carries a primary seal lip 24 and a secondary seal lip 26. In the exemplary embodiment depicted, seal body 22 and seal lips 24, 26 are formed one-piece, but it is also possible to manufacture the seal elements 16 from a plurality of parts. In the exemplary embodiment shown, the seal body 22 has a structure 28 in the form of a flange that interacts with the seal carrier 12 in order to axially and radially secure the seal body 22, and thus the seal element 16, on the seal carrier 12.

Furthermore FIG. 2 shows that the primary seal lip 24 and the secondary seal lip 26 are not oriented radially as usual, but rather slip axially against an end surface of the inner ring 6. This is unusual since up to now the persons skilled in the art have assumed that an axial seal or an axially extending primary seal 24 cannot exert sufficient contact force against the end surface 30 or another axial surface to securely and reliably protect the bearing interior 8 from contamination from outside and to hold a lubricant, optionally located in the bearing interior 8, therein.

However, it has surprisingly been found that the seal lip can be formed such that it can also exert a sufficient contact force in the axial direction. The distance D between the seal carrier 12 and end side 30, the material of the seal element, and in particular of the primary seal lip, its length L1, its angle α with respect to the end surface 30, its geometric design, and its spread angle β with respect to the secondary seal lip 26 also play a role in establishing the contact force. In order to obtain a particularly good contact force, the contact force achieved and its behavior over the entire service life of the bearing is simulated for the seal element, and the parameters are adapted accordingly.

Thus, for example, the primary seal lip 24 depicted in FIG. 2 and enlarged in FIG. 3 shows a geometric design having a shape curved slightly outward and thickened in the center, and has a lip-spread angle β of approximately 120° with respect to the secondary seal lip 26. Furthermore, the distance D between seal carrier 12 and end surface 30 of the bearing inner ring 6 is set such that even with high load and long service life the seal lip 24 is always in contact with the end surface 30. Furthermore it is preferred that the angle α of the primary seal lip 24 with respect to the end surface 30 of the bearing inner ring 6 falls approximately in the range between 20° and 60°. Furthermore it has been found to be preferred to manufacture the seal element and in particular the primary seal lip 24 from an elastic material, preferably nitrile butadiene rubber or hydrogenated acrylonitrile butadiene rubber. These materials have sufficient strength, high elasticity, and high smoothness, so that the seal lip sealingly abuts against the end surface 30 over its service life without being damaged due to high frictional torque or hindering the rotation of the bearing components. In addition, these materials show high resistance to ozone and can also be used at low temperatures.

In order to attach the seal element 16 to the seal carrier 12, in the exemplary embodiment of FIG. 2 it is furthermore depicted that the seal carrier 12 includes an undercut 32 that interacts with the structure 28, i.e., the flange of the seal body 22, in order to radially and axially secure the seal element 16. Furthermore the undercut forms a type of labyrinth seal together with the flange 28, which labyrinth seal further seals the bearing interior 8. In order to additionally seal the bearing interior 8, as can also be seen in particular from the enlarged depiction of the seal lips in FIG. 3 a radially extending projection 34 is formed on the seal element 16 in the region of the structure 28, and an axially extending projection 36 is formed in the region of the seal body 22, to ensure an additional sealing between seal element 16 and clamping ring 18 or seal carrier 12. In addition, the seal body 22 can also be adhered to the clamping ring 18 and/or the seal carrier.

As already mentioned above, to establish the contact force of the primary seal 24, the distance D between the seal carrier 12 and the end surface 30 of the bearing inner ring is important, among other things. In the bearings known from the prior art, the seal carrier 12 is manufactured from a metal plate, which, however, especially in large rolling-element bearings, is slightly bent, so that in conventional bearings the distance D varies greatly over the circumference. With an axially extending seal this variation causes the primary seal lip 24 to not always abut against the end surface 30 of the bearing inner ring 6, but rather to be spaced therefrom. An axial seal assembly has therefore never been considered practicable by persons skilled in the art.

In order to reduce the axial imbalance as much as possible, it is therefore further proposed to manufacture the seal carrier 12 not from a metal-plate material, as known from the prior art, but rather from a fiber-reinforced plastic, in particular from fiberglass-reinforced plastic (FRP). FRP has the property that on the one hand it is light, whereby the total weight of the large rolling-element bearing can be reduced, but on the other hand is very stable and free of deformations, so that even with large rolling-element bearings the distance D between seal carrier 12 and end surface 30 can be precisely set and held constant over the circumference. Here it has been found to be advantageous not to laminate, as is usual, the FRP material, but rather to compression-mold it from a fiber-matrix-composite plate, which in particular increases the dimensional stability and precision of manufacturing.

Furthermore, the seal carrier 12 can be formed one-part or multi-part, and further structures, such as, for example, venting bores, lubricant supply bores, endoscopy bores, etc., can be directly formed during the manufacturing process.

Figure 4A:
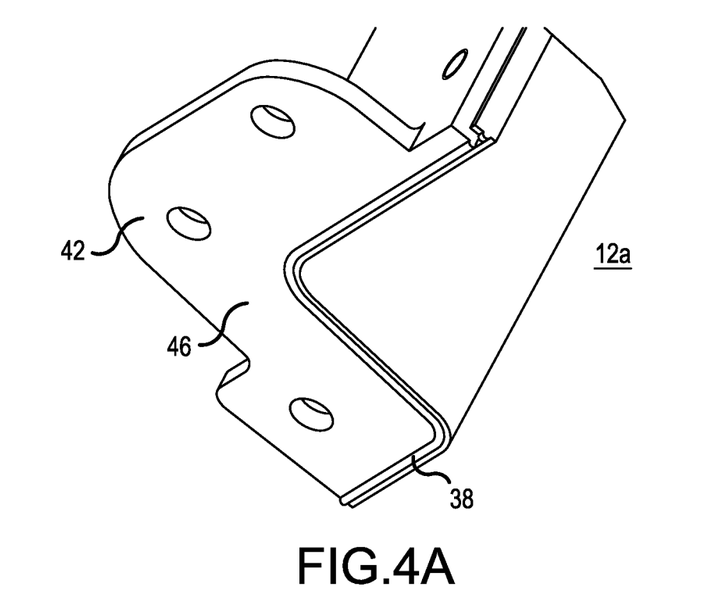
FIGS. 4A and 4B are schematic detail views of complementary portions of a seal carrier usable in the rolling-element bearing assembly.
Figure 4B:
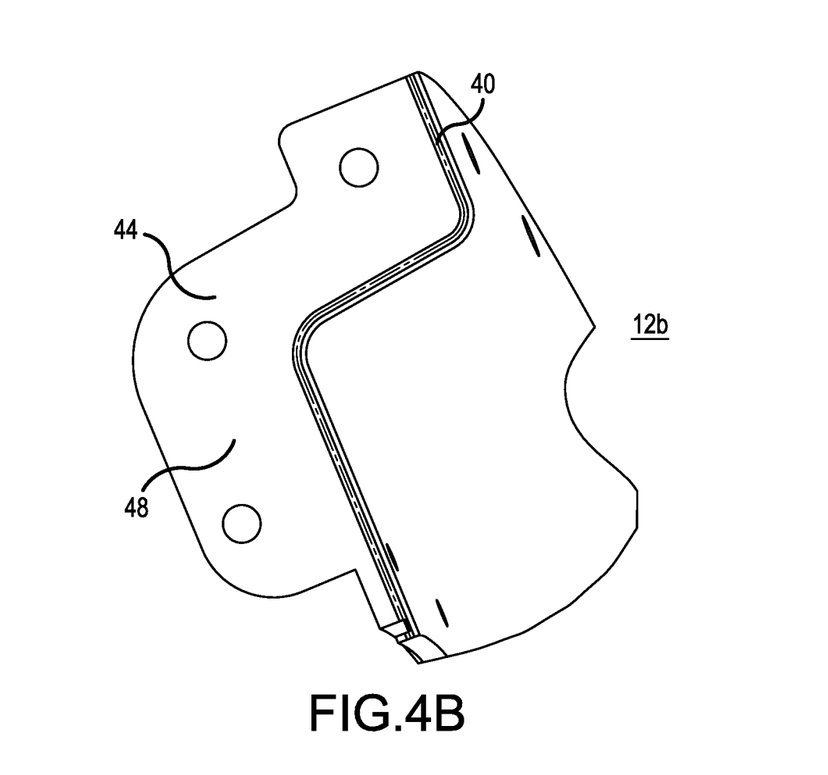

In a multi-part embodiment it is also advantageous that, as depicted in FIGS. 4A and 4B, two mutually abutting, adjacent seal carrier segment parts 12a, 12b include mutually complementary structures 38, 40. In the exemplary embodiment depicted in FIGS. 4A and 4B, the mutually complementary structures are realized by a projection 38 and a correspondingly configured groove 40, which engage one-into-the-other during assembly and align the seal carrier segments 12a, 12b to each other radially and axially. Furthermore, a flange element 42, 44 can be attached to each of the seal carrier segments 12a, 12b, which flange elements 42, 44 can be screwed to one another in order to connect the seal carrier segments 12a, 12b to one another. In addition, the joint surfaces 46, 48 of the seal carrier segments, in particular the flange surfaces, can be coated with a seal material, in particular a liquid seal, in order to ensure the sealability of the seal carrier 12 in the circumferential direction. The seal carrier segments 12a, 12b can also be only adhered to each other, wherein the adhesive can then assume both the attaching- and the sealing-function.

Instead of the depicted tongue-and-groove connection it is of course also possible to form other suitable complementary structures in order to make possible a radial, axial, and/or circumferential fixing and orienting of the seal carrier segments with respect to one another. However, it is particularly advantageous here if the complementary structures include at least one radial and one axial stop, so that the orienting of the seal carrier segments is simplified.

Figure 5:
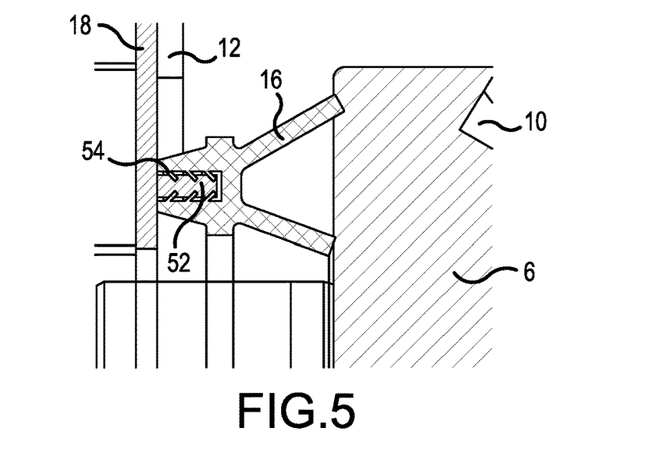
FIG. 5 is a schematic detail view of another embodiment of a seal element according to the present disclosure.
Figure 6:
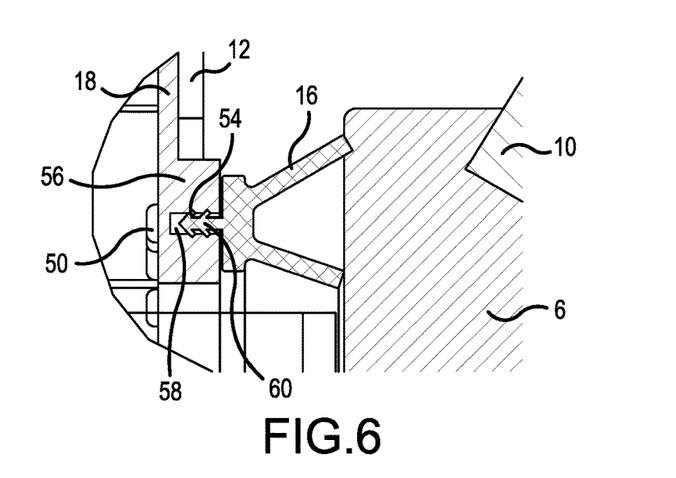
FIG. 6 is a schematic detail view of another embodiment of a seal element according to the present disclosure.
Figure 7:
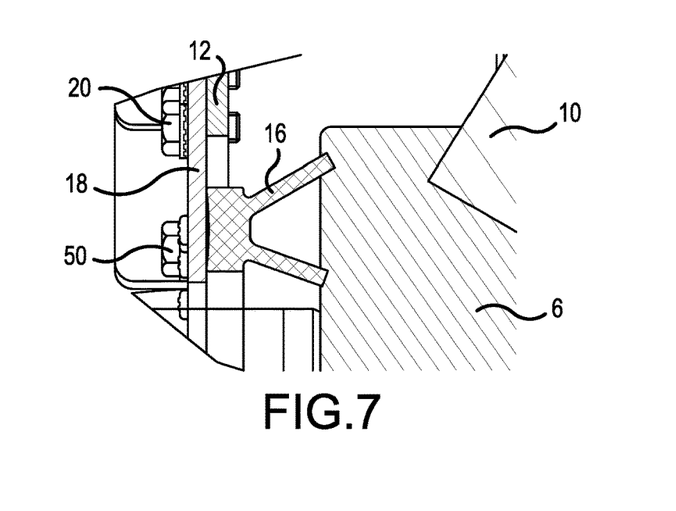
FIG. 7 is a schematic detail view of another embodiment of a seal element according to the present disclosure.

FIGS. 5, 6 and 7 show further alternative attachment possibilities for the seal element 16 to the seal carrier 12 or the clamping element 18. In the other embodiments shown, the seal element 16 is only connected to the clamping element 18 and is not directly attached to the seal carrier 12. FIGS. 5 and 6 thus each show designs wherein the seal element 16 and the clamping ring 18 are connected to each other in an interference- and friction-fit manner. Here a purely interference- and friction-fit design is shown in FIG. 5, while in FIG. 6 the interference- or friction-fit is supplemented by a friction-fit with the aid of additional attachment elements 50. In FIG. 5 the clamping ring 18 includes a projection 52 on which the seal element 16, which is equipped with barbs 54, is clamped. On the other hand in the exemplary embodiment of FIG. 6 the clamping ring 18 includes a thickening 56 including a groove 58, into which an extension 60 of the seal element, which extension 60 is also equipped with barbs 54, engages. In addition, the attachment elements 50 are provided that attach the seal element 16 to the clamping ring 18 such that they rotate together. Of course the seal element 16 can also be screwed onto the clamping ring 18 only by the screws 50, as is depicted, for example, in FIG. 7.

A rolling-element bearing assembly as described in FIGS. 1 to 7 is advantageous in particular when the inner ring is configured stationary and the outer ring is configured to rotate, but it can also be used with stationary outer ring and rotating inner ring.

Overall, using the presented rolling-element bearing assembly a large rolling-element bearing assembly can be provided that, with diameters over one meter, makes possible both a weight savings and an improved seal performance. The combination of FRP material, which is in particular compression-molded from a fiber-composite plate, and the axially extending seal makes possible an optimal axial sealing, since due to the FRP seal carrier a particularly precise setting is possible of the distance between seal carrier and end surface of the inner ring.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved seals for rolling-element bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A rolling-element bearing assembly comprising:
   a first bearing ring and a second bearing ring that form a bearing interior between them,
   a plurality of rolling elements disposed in the bearing interior to allow a relative rotation of a first bearing ring and a second bearing ring, and
   a seal assembly for sealing the bearing interior, the seal assembly including a seal carrier, a clamping ring and a seal element,
   the seal carrier being connected to the first bearing ring such that they rotate together, and
   the seal element including at least one primary seal lip for sealing the bearing interior and a secondary seal lip for sealing against external contamination,
   wherein the seal element is connected to the seal carrier such that the primary seal lip and the secondary seal lip abut against an axial end surface of the second bearing ring,
   wherein the seal assembly includes a radially outer portion in contact with the first bearing ring and a radially inner portion defining a radially inner opening, wherein a diameter of the radially inner opening is less than an outer diameter of the second bearing ring, and wherein the primary seal lip is located entirely radially outward of the radially inner opening.

2. The rolling-element bearing assembly according to claim 1, wherein the seal element further includes a seal body from which the primary seal lip and the secondary seal lip project, and wherein the seal body, the primary seal lip and the secondary seal lip form a one-piece element.

3. The rolling-element bearing assembly according to claim 2, wherein the seal body abuts against a radial surface of the seal carrier and is attached to the seal carrier by the clamping ring.

4. The rolling-element bearing assembly according to claim 3, wherein the clamping ring is attached to the seal carrier by screws.

5. The rolling-element bearing assembly according to claim 2, wherein:

the seal element is clamped between the seal carrier and the clamping ring, or the seal element is attached to the clamping ring by friction-fit, or the seal element and the clamping ring include structures interacting with one another in an interference-fit manner to connect the seal element and the clamping ring to one another via an interference-fit, or the seal element is attached to the clamping ring in a materially-bonded manner.

6. The rolling-element bearing assembly according to claim 2, wherein the primary seal lip abuts against the axial end surface of the second bearing ring with a predetermined contact force, wherein the primary seal lip and the secondary seal lip form a lip-spread angle that falls in a range from 100° to 140°, wherein the seal element is manufactured from nitrile butadiene rubber (NBR) or hydrogenated acrylonitrile butadiene rubber (HNBR), wherein the seal carrier is manufactured from a fiber-reinforced plastic material, and wherein the seal body abuts against a radial surface of the seal carrier and is attached to the seal carrier by a circumferentially extending clamping ring.

7. The rolling-element bearing according to claim 2, wherein the seal body does not contact a radial surface of the second bearing ring.

8. The rolling-element bearing assembly according to claim 2, wherein the seal body is located entirely radially outward of the radial inner opening.

9. The rolling-element bearing assembly according to claim 8, wherein the secondary seal lip is located entirely radially outward of the radial inner opening.

10. The rolling-element bearing assembly according to claim 1, wherein the primary seal lip abuts against the axial end surface of the second bearing ring with a predetermined contact force.

11. The rolling-element bearing assembly according to claim 10, wherein the contact force of the primary seal lip is determined by a length of the seal lip, an angle of the seal lip with respect to the end surface, a material of the seal lip, a geometric design of the seal lip, and/or a defined distance of the seal carrier to the axial end surface of the second bearing ring.

12. The rolling-element bearing assembly according to claim 1, wherein the seal element is manufactured from nitrile butadiene rubber (NBR) or hydrogenated acrylonitrile butadiene rubber (HNBR).

13. The rolling-element bearing assembly according to claim 1, wherein the seal carrier is manufactured from a fiber-reinforced plastic material.

14. The rolling-element bearing according to claim 1, including a lubricant in the bearing interior in contact with the primary sealing lip.

15. The rolling-element bearing according to claim 14, wherein the primary sealing lip does not contact any radial surface of the bearing second ring.

16. The rolling-element bearing assembly according to claim 1, wherein the secondary seal lip is located entirely radially outward of the radial inner opening.

17. The rolling-element bearing assembly according to claim 1, wherein the primary seal lip and the secondary seal lip form a lip-spread angle that falls in a range from 100° to 140°.

18. A rolling-element bearing assembly comprising:

a first bearing ring and a second bearing ring that form a bearing interior between them, a plurality of rolling elements disposed in the bearing interior to allow a relative rotation of a first bearing ring and a second bearing ring, and a seal assembly for sealing the bearing interior, the seal assembly including a seal carrier and a seal element, the seal carrier being connected to the first bearing ring such that they rotate together, and the seal element including at least one primary seal lip for sealing the bearing interior and a secondary seal lip for sealing against external contamination, wherein the seal element is connected to the seal carrier such that the primary seal lip and the secondary seal lip abut against an axial end surface of the second bearing ring, and wherein the primary seal lip and the secondary seal lip form a lip-spread angle that falls in a range from 100° to 140°.

19. The rolling-element bearing according to claim 18, wherein the lip-spread angle is 120°.

20. A rolling-element bearing assembly comprising:

a first bearing ring and a second bearing ring that form a bearing interior between them, a plurality of rolling elements disposed in the bearing interior to allow a relative rotation of a first bearing ring and a second bearing ring, and a seal assembly for sealing the bearing interior, the seal assembly including a seal carrier and a seal element, the seal carrier being connected to the first bearing ring such that they rotate together, and the seal element including at least one primary seal lip for sealing the bearing interior and a secondary seal lip for sealing against external contamination, wherein the seal element is connected to the seal carrier such that the primary seal lip and the secondary seal lip abut against an axial end surface of the second bearing ring, wherein the seal element further includes a seal body from which the primary seal lip and the secondary seal lip project, wherein the seal body, the primary seal lip and the secondary seal lip form a one-piece element, wherein the seal element is attached to the seal carrier such that they rotate together, and wherein the seal carrier includes an undercut and the seal element engages into the undercut with a flange formed on the seal body.

\* \* \* \* \*